United States Patent
Eiriksson et al.

(10) Patent No.: US 12,180,941 B2
(45) Date of Patent: Dec. 31, 2024

(54) LIGHTNING PROTECTION SYSTEM FOR A MAIN LAMINATE

(71) Applicant: LM WIND POWER A/S, Kolding (DK)

(72) Inventors: Boas Eiriksson, Kolding (DK); Mathilde Aubrion, Kolding (DK)

(73) Assignee: LM WIND POWER A/S, Kolding (DK)

( * ) Notice: Subject to any disclaimer, the term of this patent is extended or adjusted under 35 U.S.C. 154(b) by 42 days.

(21) Appl. No.: 17/791,710

(22) PCT Filed: Feb. 18, 2021

(86) PCT No.: PCT/EP2021/054037
§ 371 (c)(1),
(2) Date: Jul. 8, 2022

(87) PCT Pub. No.: WO2021/165404
PCT Pub. Date: Aug. 26, 2021

(65) Prior Publication Data
US 2023/0041394 A1    Feb. 9, 2023

(30) Foreign Application Priority Data

Feb. 21, 2020 (GB) .................................. 20022431

(51) Int. Cl.
| | |
|---|---|
| F03D 80/30 | (2016.01) |
| B29C 70/52 | (2006.01) |
| B29C 70/86 | (2006.01) |
| B29C 70/88 | (2006.01) |
| B29D 99/00 | (2010.01) |
| F03D 1/06 | (2006.01) |

(52) U.S. Cl.
CPC .............. F03D 80/30 (2016.05); B29C 70/52 (2013.01); B29C 70/865 (2013.01); B29C 70/885 (2013.01); B29D 99/0028 (2013.01); F03D 1/0675 (2013.01); *F03D 80/301* (2023.08); *F05B 2230/60* (2013.01)

(58) Field of Classification Search
CPC ..... B29C 70/52; B29C 70/865; B29C 70/885; B29D 99/0028; F03D 1/0675; F03D 80/30; F03D 80/301; Y02E 10/72; Y02P 70/50; F05B 2230/60
See application file for complete search history.

(56) References Cited

U.S. PATENT DOCUMENTS

| | | | | |
|---|---|---|---|---|
| 9,920,739 | B2 * | 3/2018 | Akhtar | ............. F03D 13/10 |
| 11,131,290 | B2 * | 9/2021 | Pal | ............ F01D 5/282 |
| 11,447,666 | B2 * | 9/2022 | Baldini | ............. B32B 27/08 |
| 2006/0280613 | A1 | 12/2006 | Hansen | |

(Continued)

FOREIGN PATENT DOCUMENTS

EP     3330529 A1     6/2018

*Primary Examiner* — Jesse S Bogue
(74) *Attorney, Agent, or Firm* — Nath, Goldberg & Meyer; Tanya E. Harkins

(57) ABSTRACT

Disclosed a wind turbine blade comprising a main laminate and a method for manufacturing a main laminate for a wind turbine blade. The wind turbine blade extends in a longitudinal direction from a root to a tip and comprising a pressure side, a suction side and a chord line extending between a leading edge and a trailing edge. Particularly, lightning protection of such main laminate is disclosed.

25 Claims, 7 Drawing Sheets

(56) References Cited

U.S. PATENT DOCUMENTS

| | | | |
|---|---|---|---|
| 2014/0301859 A1* | 10/2014 | Hancock | F03D 1/0675 156/60 |
| 2016/0131110 A1* | 5/2016 | Livingston | F03D 1/0675 416/146 R |
| 2016/0221272 A1* | 8/2016 | Koefoed | F03D 80/30 |
| 2018/0156202 A1 | 6/2018 | Lipka et al. | |
| 2020/0025178 A1 | 1/2020 | Christiansen et al. | |

\* cited by examiner

LIGHTNING PROTECTION SYSTEM FOR A MAIN LAMINATE

This is a National Phase Application filed under 35 U.S.C. 371 as a national stage of PCT/EP2021/054037, filed Feb. 18, 2021, an application claiming the benefit of Great Britain Application No. 20022431.1, filed Feb. 21, 2020, the content of each of which is hereby incorporated by reference in its entirety.

The present disclosure relates to lightning protection of a main laminate of a wind turbine blade. Particularly, lightning protection system of a main laminate comprising carbon fibres, such as in pultruded carbon elements. The main laminate denotes the load-carrying structure of the blade and may be integrated in the shell of the blade. The main laminate may alternatively be referred to as a spar cap.

BACKGROUND

As wind turbines and wind turbine blades increase in size, the risk of lighting striking the wind turbine increases. It is therefore of increasing interest to provide wind turbines and in particular wind turbine blades with lightning protection measures.

It is known to provide blades for wind turbines with lightning receptors that are, inside the blade, in electric connection with a down conductor that is able to connect a lightning current to earth.

A wind turbine blade is typically assembled by a number of components. For example, a typical wind turbine blade is manufactured by moulding individual shell halves, shear webs etc.

Wind turbine blades of fibre-reinforced polymer and in particular the aerodynamic shells of wind turbine blades are usually manufactured in moulds, where the pressure side and the suction side of the blade are manufactured separately by arranging glass fibre mats and/or other fibre-reinforcement material, such as carbon fibre, in each of the two mould parts. Afterwards, the two halves are positioned on top of each other, and the two halves are glued together. The blade parts may be positioned on top of each other by turning and repositioning the complete half mould.

As the demand for blades for wind turbines tends towards blades of increasing lengths, a need concurrently arises for manufacture of blades having increased rigidity and a comparatively lower weight. One way of achieving these properties it to combine various types of fibres in the laminate of the blades, for instance it is an option to combine glass fibres and carbon fibres, and likewise carbon fibres or glass fibres may advantageously be combined with steel fibres. Combinations with other types of fibres are thus also possible and it is also an option to exclusively employ carbon fibres or other suitable fibre type. Combination of e.g. glass fibres with carbon fibres in a so-called hybrid laminate may possess a problem in that some of the fibre types are electrically conductive, e.g. carbon fibres and steel fibres. A lightning strike directly into the laminate may cause damage to a blade comprising electrically conductive fibres, as they would conduct the current and thereby i.a. be greatly heated. Furthermore, resin bonding fibres together might be a poor conductor, providing for risk of flashover between conductive fibres being held in the resin, which may potentially damage the material.

Thus, it is of increasing importance to provide a lightning protection system and ways of integrating a lightning protection system, which protects components of the wind turbine blade, comprising electrically conductive materials, from being damaged by lightning strikes.

SUMMARY

It is an object of the present disclosure to provide a wind turbine blade comprising a main laminate, and a method for manufacturing such main laminate which overcomes at least some of the disadvantages of the prior art.

In particular, it is an object of the present invention to provide a main laminate, a wind turbine blade comprising such main laminate, and a method for manufacturing such main laminate, which facilitates an effective and reliable lightning protection of the components comprising conductive elements of the wind turbine blade.

Accordingly, a main laminate and a wind turbine blade comprising a main laminate is disclosed. Also disclosed is a method for manufacturing the main laminate as described.

The wind turbine blade extends in a longitudinal direction from a root to a tip. The wind turbine blade comprising a pressure side, a suction side, a chord line extending between a leading edge and a trailing edge, and a blade median between the pressure side and the suction side. The main laminate extends along the longitudinal direction. The main laminate has a thickness direction substantially perpendicular to the longitudinal direction and substantially perpendicular to the chord line. The main laminate has a width direction substantially perpendicular to the longitudinal direction and substantially parallel to the chord line. The width direction is substantially perpendicular to the thickness direction.

The main laminate comprises a plurality of pultruded elements, e.g. including a first pultruded element, a second pultruded element, a third pultruded element, a fourth pultruded element, a fifth pultruded element and/or one or more intermediate pultruded elements. Each of the plurality of pultruded elements comprises carbon fibres arranged substantially along the longitudinal direction. The pultruded elements may be of fibrous composite material, e.g. made by pultruding a mixture of fibres, e.g. carbon fibres, and a matrix material that is cured after pultrusion, such as a processable resin, e.g. vinyl ester or epoxy. Each of the plurality of pultruded elements has a top surface to be facing towards the blade median and a bottom surface opposite the top surface. Each of the plurality of pultruded elements has a primary end surface, e.g. to be facing towards the tip, and a secondary end surface, e.g. to be facing towards the root. The method may comprise providing the plurality of pultruded elements. The top surface of each of the plurality of pultruded elements may have a first top length along the longitudinal direction. The bottom surface of each of the plurality of pultruded elements may have a bottom length along the longitudinal direction. The first top length of the first pultruded element may be longer than the second bottom length of the second pultruded element. The second top length of the second pultruded element may be longer than the third bottom length of the third pultruded element. The third top length of the third pultruded element may be longer than the fourth bottom length of the fourth pultruded element. The fourth top length of the fourth pultruded element may be longer than the fifth bottom length of the fifth pultruded element.

Each of the plurality of pultruded elements may comprise an element thickness along the thickness direction of the main laminate between the top surface and the bottom surface. The element thickness may be substantially uniform.

The primary and/or secondary end surfaces may form an oblique surface relative to the top surface and bottom surface of the respective pultruded element. For example, the primary end surface of a pultruded element may form a primary top angle with the top surface of the same pultruded element, and/or the secondary end surface of a pultruded element may form a secondary top angle with the top surface of the same pultruded element. The primary end surface of a pultruded element may form a primary bottom angle with the bottom surface of the same pultruded element, and/or the secondary end surface of a pultruded element may form a secondary bottom angle with the bottom surface of the same pultruded element. For example, each of the plurality of pultruded elements may form a primary top angle with the top surface and a primary bottom angle with the bottom surface. The primary top angle may be more than 90 degrees, such as between 90 and 175 degrees, such as between 95-175 degrees, such as between 120 and 150 degrees. The primary bottom angle may be less than 90 degrees, such as between 5 and 90 degrees, such as between 5-85 degrees, such as between 30-70 degrees. The secondary top angle may be more than 90 degrees, such as between 90 and 175 degrees, such as between 95-175 degrees, such as between 120 and 150 degrees. The secondary bottom angle may be less than 90 degrees, such as between 5 and 90 degrees, such as between 5-85 degrees, such as between 30-70 degrees.

The plurality of pultruded elements may be arranged on top of each other in the thickness direction and/or next to each other in the width direction. For example, the second pultruded element may be arranged in the thickness direction to be closer to the blade median than the first pultruded element. The third pultruded element may be arranged in the thickness direction to be closer to the blade median than the second pultruded element. The fourth pultruded element may be arranged in the thickness direction to be closer to the blade median than the third pultruded element. The fifth pultruded element may be arranged in the thickness direction to be closer to the blade median than the fourth pultruded element. The one or more intermediate pultruded elements may be arranged in the thickness direction to be closer to the blade median than the first pultruded element and/or the second pultruded element. The third pultruded element, the fourth pultruded element and/or the fifth pultruded element may be arranged in the thickness direction to be closer to the blade median than the one or more intermediate pultruded elements. The one or more intermediate pultruded elements may be arranged in the thickness direction between the second pultruded element and the third pultruded element.

The first pultruded element and the second pultruded element may be arranged such that a primary portion of the top surface of the first pultruded element is not covered by the second pultruded element. The second pultruded element and the third pultruded element may be arranged such that a primary portion of the top surface of the second pultruded element is not covered by the third pultruded element. The third pultruded element and the fourth pultruded element may be arranged such that a primary portion of the top surface of the third pultruded element is not covered by the fourth pultruded element. The fourth pultruded element and the fifth pultruded element may be arranged such that a primary portion of the top surface of the fourth pultruded element is not covered by the fifth pultruded element. Each of the primary portions of the top surface of the first pultruded element, the second pultruded element, the third pultruded element and/or the fourth pultruded element, may have a length along the longitudinal direction of at least 200 mm, such as at least 300 mm, such as at least 400 mm, such as at least 500 mm. The length of the primary portions may be provided to allow positioning of a conductive mesh element (described later) within the primary portions.

The first pultruded element and the second pultruded element may be arranged such that a secondary portion of the top surface of the first pultruded element is not covered by the second pultruded element. The second pultruded element and the third pultruded element may be arranged such that a secondary portion of the top surface of the second pultruded element is not covered by the third pultruded element. The third pultruded element and the fourth pultruded element may be arranged such that a secondary portion of the top surface of the third pultruded element is not covered by the fourth pultruded element. The fourth pultruded element and the fifth pultruded element may be arranged such that a secondary portion of the top surface of the fourth pultruded element is not covered by the fifth pultruded element. Each of the secondary portions of the top surface of the first pultruded element, the second pultruded element, the third pultruded element and/or the fourth pultruded element, may have a length along the longitudinal direction of at least 200 mm, such as at least 300 mm, such as at least 400 mm, such as at least 500 mm. The length of the secondary portions may be provided to allow positioning of a conductive mesh element (described later) within the secondary portions.

A primary conductive sheet may be provided. The primary conductive sheet may comprise one or more layers of conductive material. The primary conductive sheet may be a single layered conductive sheet, the primary conductive sheet may be a double layered conductive sheet, or the primary conductive sheet may be a multi layered conductive sheet. The main laminate may comprise the primary conductive sheet. The primary conductive sheet may cover the primary end surface of the second pultruded element, the primary portion of the top surface of the first pultruded element, and/or the primary end surface of the first pultruded element. The primary conductive sheet may cover the primary end surfaces of one or more, such as each, of the plurality of pultruded elements, such as of the first pultruded element, the second pultruded element, the third pultruded element, the fourth pultruded element and/or the fifth pultruded element. The primary conductive sheet may cover the primary portion of the top surface of one or more, such as each, of the plurality of pultruded elements, such as of the first pultruded element, the second pultruded element, the third pultruded element, the fourth pultruded element and/or the fifth pultruded element. The primary conductive sheet may be or comprise a carbon fabric, such as a carbon biaxial fabric or unidirectional carbon fibre fabric. The primary conductive sheet may be or comprise hybrid fabric, i.e. comprising a plurality of different fibre types, e.g. glass fibre and carbon fibre. The hybrid fabric may be a biaxial hybrid fabric or unidirectional hybrid fabric. The primary conductive sheet may comprise a plurality of fabrics. The plurality of fabrics may comprise one or more carbon fabrics, such as carbon biaxial fabrics or unidirectional carbon fibre fabrics, one or more hybrid fabrics, such as hybrid biaxial fabrics or unidirectional hybrid fibre fabrics, or a combination thereof. Alternatively or additionally, the primary conductive sheet may comprise copper.

A secondary conductive sheet may be provided. The secondary conductive sheet may comprise one or more layers of conductive material. The secondary conductive sheet may be a single layered conductive sheet, the secondary conductive sheet may be a double layered conductive sheet, or the secondary conductive sheet may be a multi layered conductive sheet. The main laminate may comprise the secondary conductive sheet. The secondary conductive sheet may cover the secondary end surface of the second pultruded element, the secondary portion of the top surface of the first pultruded element, and/or the secondary end surface of the first pultruded element. The secondary conductive sheet may cover the secondary end surfaces of one or more, such as each, of the plurality of pultruded elements, such as of the first pultruded element, the second pultruded element, the third pultruded element, the fourth pultruded element and/or the fifth pultruded element. The secondary conductive sheet may cover the secondary portion of the top surface of one or more, such as each, of the plurality of pultruded elements, such as of the first pultruded element, the second pultruded element, the third pultruded element, the fourth pultruded element and/or the fifth pultruded element. The secondary conductive sheet may be or comprise a carbon fabric, such as a carbon biaxial fabric or unidirectional carbon fibre fabric. The secondary conductive sheet may be or comprise hybrid fabric, i.e. comprising a plurality of different fibre types, e.g. glass fibre and carbon fibre. The hybrid fabric may be a biaxial hybrid fabric or unidirectional hybrid fabric. The secondary conductive sheet may comprise a plurality of fabrics. The plurality of fabrics may comprise one or more carbon fabrics, such as carbon biaxial fabrics or unidirectional carbon fibre fabrics, one or more hybrid fabrics, such as hybrid biaxial fabrics or unidirectional hybrid fibre fabrics, or a combination thereof. Alternatively or additionally, the secondary conductive sheet may comprise copper.

The wind turbine blade comprises a down conductor extending in the longitudinal direction. The down conductor may be configured to provide an electrical coupling to the ground. The down conductor may be arranged on a shear web of the wind turbine blade and may be extending along the shear web. For example, the down conductor may be arranged on a trailing edge shear web of the wind turbine blade, such as on a leading edge side of the trailing edge shear web. Accordingly, the wind turbine blade may comprise one or more shear webs extending between the pressure side and the suction side of the wind turbine blade. For example, the shear webs may extend between a first main laminate, e.g. according to the present disclosure, being arranged towards the pressure side and a second main laminate, e.g. according to the present disclosure, being arranged towards the suction side. The wind turbine blade may further comprise one or more lightning receptors, e.g. including a first lightning receptor and/or a second lightning receptor. The one or more lightning receptors may be at or in proximity of an external surface of the wind turbine blade. The one or more lightning receptors may be electrically connected to the down conductor.

The main laminate may comprise one or more conductive mesh elements, e.g. including a first primary conductive mesh element a first secondary conductive mesh element, a second primary conductive mesh element a second secondary conductive mesh element, a third primary conductive mesh element a third secondary conductive mesh element, a fourth primary conductive mesh element a fourth secondary conductive mesh element, a fifth primary conductive mesh element a fifth secondary conductive mesh element. Each of the one or more conductive mesh elements may comprise a first mesh portion and/or a second mesh portion. The conductive mesh elements may comprise a copper mesh.

The first mesh portion of the first primary conductive mesh element may be arranged at the primary portion of the top surface of the first pultruded element, e.g. such that the primary conductive sheet is arranged between the first mesh portion of the first primary conductive mesh element and the primary portion of the top surface of the first pultruded element. The first mesh portion of the first secondary conductive mesh element may be arranged at the secondary portion of the top surface of the first pultruded element, e.g. such that the secondary conductive sheet is arranged between the first mesh portion of the first secondary conductive mesh element and the secondary portion of the top surface of the first pultruded element.

The first mesh portion of the second primary conductive mesh element may be arranged at the primary portion of the top surface of the second pultruded element, e.g. such that the primary conductive sheet is arranged between the first mesh portion of the second primary conductive mesh element and the primary portion of the top surface of the second pultruded element. The first mesh portion of the second secondary conductive mesh element may be arranged at the secondary portion of the top surface of the second pultruded element, e.g. such that the secondary conductive sheet is arranged between the first mesh portion of the second secondary conductive mesh element and the secondary portion of the top surface of the second pultruded element.

The first mesh portion of the third primary conductive mesh element may be arranged at the primary portion of the top surface of the third pultruded element, e.g. such that the primary conductive sheet is arranged between the first mesh portion of the third primary conductive mesh element and the primary portion of the top surface of the third pultruded element. The first mesh portion of the third secondary conductive mesh element may be arranged at the secondary portion of the top surface of the third pultruded element, e.g. such that the secondary conductive sheet is arranged between the first mesh portion of the third secondary conductive mesh element and the secondary portion of the top surface of the third pultruded element.

The first mesh portion of the fourth primary conductive mesh element may be arranged at the primary portion of the top surface of the fourth pultruded element, e.g. such that the primary conductive sheet is arranged between the first mesh portion of the fourth primary conductive mesh element and the primary portion of the top surface of the fourth pultruded element. The first mesh portion of the fourth secondary conductive mesh element may be arranged at the secondary portion of the top surface of the fourth pultruded element, e.g. such that the secondary conductive sheet is arranged between the first mesh portion of the fourth secondary conductive mesh element and the secondary portion of the top surface of the fourth pultruded element.

Each of the conductive mesh elements may be electrically connected to the down conductor. A lightning receptor and a conductive mesh element may be electrically connected to the down conductor by a common connector element. For example, the first lightning receptor and the first primary conductive mesh element may be electrically connected to the down conductor by the common connector element. A second lightning receptor and the second primary conductive mesh element may be electrically connected to the down conductor by a second common connector element. Lightning receptors are in some cases not needed close to the root of the blade. Thus, some conductive mesh elements, particularly those arranged towards the root, e.g. the secondary conductive mesh element(s) may be connected to the down conductor without a common connection to a lightning receptor. For example, the secondary conductive mesh element(s), such as the first secondary conductive mesh element, the second secondary conductive mesh element, the third secondary conductive mesh element, the fourth secondary conductive mesh element, and/or the fifth secondary conductive mesh element. may be electrically connected to the down conductor with internal connector(s). The primary conductive mesh element(s), such as the first primary conductive mesh element, the second primary conductive mesh element, the third primary conductive mesh element, the fourth primary conductive mesh element, and/or the fifth primary conductive mesh element. may be electrically connected to the down conductor together with respective lightning receptor(s) by common connector(s).

The main laminate may comprise one or more sheets of fibre material arranged between adjacent pultruded elements. For example, a sheet of fibre material may be arranged between the top surface of the first pultruded element and the bottom surface of the second pultruded element. A sheet of fibre material may be arranged between the top surface of the second pultruded element and the bottom surface of the third pultruded element. A sheet of fibre material may be arranged between the top surface of the third pultruded element and the bottom surface of the fourth pultruded element. A sheet of fibre material may be arranged between the top surface of the fourth pultruded element and the bottom surface of the fifth pultruded element. The sheets of fibre material may enhance flow of resin, e.g. in a vacuum infused resin transfer, between the pultruded elements, such as to facilitate a more even and complete distribution of resin in the final main laminate. The one or more sheets of fibre material may comprise glass fibre and/or carbon fibre and/or a combination thereof. The one or more sheets of fibre material may be electrically conducive or non-conductive. Alternatively, the one or more sheets of fibre material may be electrically conductive throughout one or more sections and electrically non-conductive throughout one or more other sections.

The main laminate may comprise one or more conductive patches arranged such that the first mesh portion of each of the conductive mesh elements is arranged between a conductive patch and a conductive sheet. For example, a first primary conductive patch may be arranged such that the first mesh portion of the first primary conductive mesh element is arranged between the first primary conductive patch and the primary conductive sheet. A first secondary conductive patch may be arranged such that the first mesh portion of the first secondary conductive mesh element is arranged between the first secondary conductive patch and the secondary conductive sheet. A second primary conductive patch may be arranged such that the first mesh portion of the second primary conductive mesh element is arranged between the second primary conductive patch and the primary conductive sheet. A second secondary conductive patch may be arranged such that the first mesh portion of the second secondary conductive mesh element is arranged between the second secondary conductive patch and the secondary conductive sheet. A third primary conductive patch may be arranged such that the first mesh portion of the third primary conductive mesh element is arranged between the third primary conductive patch and the primary conductive sheet. A third secondary conductive patch may be arranged such that the first mesh portion of the third secondary conductive mesh element is arranged between the third secondary conductive patch and the secondary conductive sheet. A fourth primary conductive patch may be arranged such that the first mesh portion of the fourth primary conductive mesh element is arranged between the fourth primary conductive patch and the primary conductive sheet. A fourth secondary conductive patch may be arranged such that the first mesh portion of the fourth secondary conductive mesh element is arranged between the fourth secondary conductive patch and the secondary conductive sheet.

The conductive patch may be in contact with the conductive sheet, e.g. the conductive patch may have a length in the longitudinal direction which is longer than a length the first mesh portion of the respective conductive mesh element in the longitudinal direction. The conductive patch may be in contact with the conductive sheet at a longitudinal position towards the tip and/or at a longitudinal position towards the root relative to the first portion of the conductive mesh element.

For example, the first primary conductive patch may be in contact with the primary conductive sheet, e.g. the first primary conductive patch may have a length in the longitudinal direction which is longer than a length of the first mesh portion of the first primary conductive mesh element in the longitudinal direction. The first primary conductive patch may be in contact with the primary conductive sheet at a longitudinal position towards the tip and/or at a longitudinal position towards the root relative to the first portion of the first primary conductive mesh element. The first secondary conductive patch may be in contact with the secondary conductive sheet, e.g. the first secondary conductive patch may have a length in the longitudinal direction which is longer than a length of the first mesh portion of the first secondary conductive mesh element in the longitudinal direction. The first secondary conductive patch may be in contact with the secondary conductive sheet at a longitudinal position towards the tip and/or at a longitudinal position towards the root relative to the first portion of the first secondary conductive mesh element.

The second primary conductive patch may be in contact with the primary conductive sheet, e.g. the second primary conductive patch may have a length in the longitudinal direction which is longer than a length of the first mesh portion of the second primary conductive mesh element in the longitudinal direction. The second primary conductive patch may be in contact with the primary conductive sheet at a longitudinal position towards the tip and/or at a longitudinal position towards the root relative to the first portion of the second primary conductive mesh element. The second secondary conductive patch may be in contact with the secondary conductive sheet, e.g. the second secondary conductive patch may have a length in the longitudinal direction which is longer than a length of the first mesh portion of the second secondary conductive mesh element in the longitudinal direction. The second secondary conductive patch may be in contact with the secondary conductive sheet at a longitudinal position towards the tip and/or at a longitudinal position towards the root relative to the first portion of the second secondary conductive mesh element.

The third primary conductive patch may be in contact with the primary conductive sheet, e.g. the third primary conductive patch may have a length in the longitudinal direction which is longer than a length of the first mesh portion of the third primary conductive mesh element in the longitudinal direction. The third primary conductive patch may be in contact with the primary conductive sheet at a longitudinal position towards the tip and/or at a longitudinal position towards the root relative to the first portion of the third primary conductive mesh element. The third secondary conductive patch may be in contact with the secondary conductive sheet, e.g. the third secondary conductive patch may have a length in the longitudinal direction which is longer than a length of the first mesh portion of the third secondary conductive mesh element in the longitudinal direction. The third secondary conductive patch may be in contact with the secondary conductive sheet at a longitudinal position towards the tip and/or at a longitudinal position towards the root relative to the first portion of the third secondary conductive mesh element.

The fourth primary conductive patch may be in contact with the primary conductive sheet, e.g. the fourth primary conductive patch may have a length in the longitudinal direction which is longer than a length of the first mesh portion of the fourth primary conductive mesh element in the longitudinal direction. The fourth primary conductive patch may be in contact with the primary conductive sheet at a longitudinal position towards the tip and/or at a longitudinal position towards the root relative to the first portion of the fourth primary conductive mesh element. The fourth secondary conductive patch may be in contact with the secondary conductive sheet, e.g. the fourth secondary conductive patch may have a length in the longitudinal direction which is longer than a length of the first mesh portion of the fourth secondary conductive mesh element in the longitudinal direction. The fourth secondary conductive patch may be in contact with the secondary conductive sheet at a longitudinal position towards the tip and/or at a longitudinal position towards the root relative to the first portion of the fourth secondary conductive mesh element.

The second mesh portion of one or more of the conductive mesh elements, such as of the first primary conductive mesh element, the first secondary conductive mesh element, the second primary conductive mesh element, the second secondary conductive mesh element, the third primary conductive mesh element, the third secondary conductive mesh element, the fourth primary conductive mesh element and/or the fourth secondary conductive mesh element, may include a connector disc. Any of the conductive mesh elements may be electrically connected to the down conductor via the connector disc of the respective mesh element. The disc of a conductive mesh element and a lightning receptor may be interconnected with a connector part of the common connector element. For example, the disc of the primary conductive mesh element and the first lightning receptor may be interconnected with a connector part of the common connector element.

The main laminate, such as the elements of the main laminate may be infused with a resin, such as epoxy or vinyl ester. For example, the main laminate may be infused by a vacuum assisted resin transfer method. Subsequently, the resin may be cured.

The method may comprise providing a main laminate mould having a main cavity and one or more primary and/or secondary cavities, e.g. including a first primary cavity, a first secondary cavity, a second primary cavity, a second secondary cavity, a third primary cavity, a third secondary cavity, a fourth primary cavity, and/or a fourth secondary cavity. The one or more primary and/or secondary cavities may be interconnected with the main cavity.

The main cavity has a main depth and the one or more primary and/or secondary cavities has a second depth. The second depth for each of the one or more primary and/or secondary cavity need not be the same. However, in one example, the second depth for each of the one or more primary and/or secondary cavity are the same.

The plurality of pultruded elements may be arranged in the main cavity of the main laminate mould. The conductive mesh elements may be arranged such that their second mesh portions are in respective primary and/or secondary cavities of the main laminate mould. For example, the first primary conductive mesh may be arranged such that the second mesh portion is in the first primary cavity. The first secondary conductive mesh may be arranged such that the second mesh portion is in the first secondary cavity. The second primary conductive mesh may be arranged such that the second mesh portion is in the second primary cavity. The second secondary conductive mesh may be arranged such that the second mesh portion is in the second secondary cavity. The third primary conductive mesh may be arranged such that the second mesh portion is in the third primary cavity. The third secondary conductive mesh may be arranged such that the second mesh portion is in the third secondary cavity. The fourth primary conductive mesh may be arranged such that the second mesh portion is in the fourth primary cavity. The fourth secondary conductive mesh may be arranged such that the second mesh portion is in the fourth secondary cavity

BRIEF DESCRIPTION OF THE FIGURES

Embodiments of the disclosure will be described in more detail in the following with regard to the accompanying figures. The figures show one way of implementing the present invention and are not to be construed as being limiting to other possible embodiments falling within the scope of the attached claim set.

DETAILED DESCRIPTION

Figure 1:
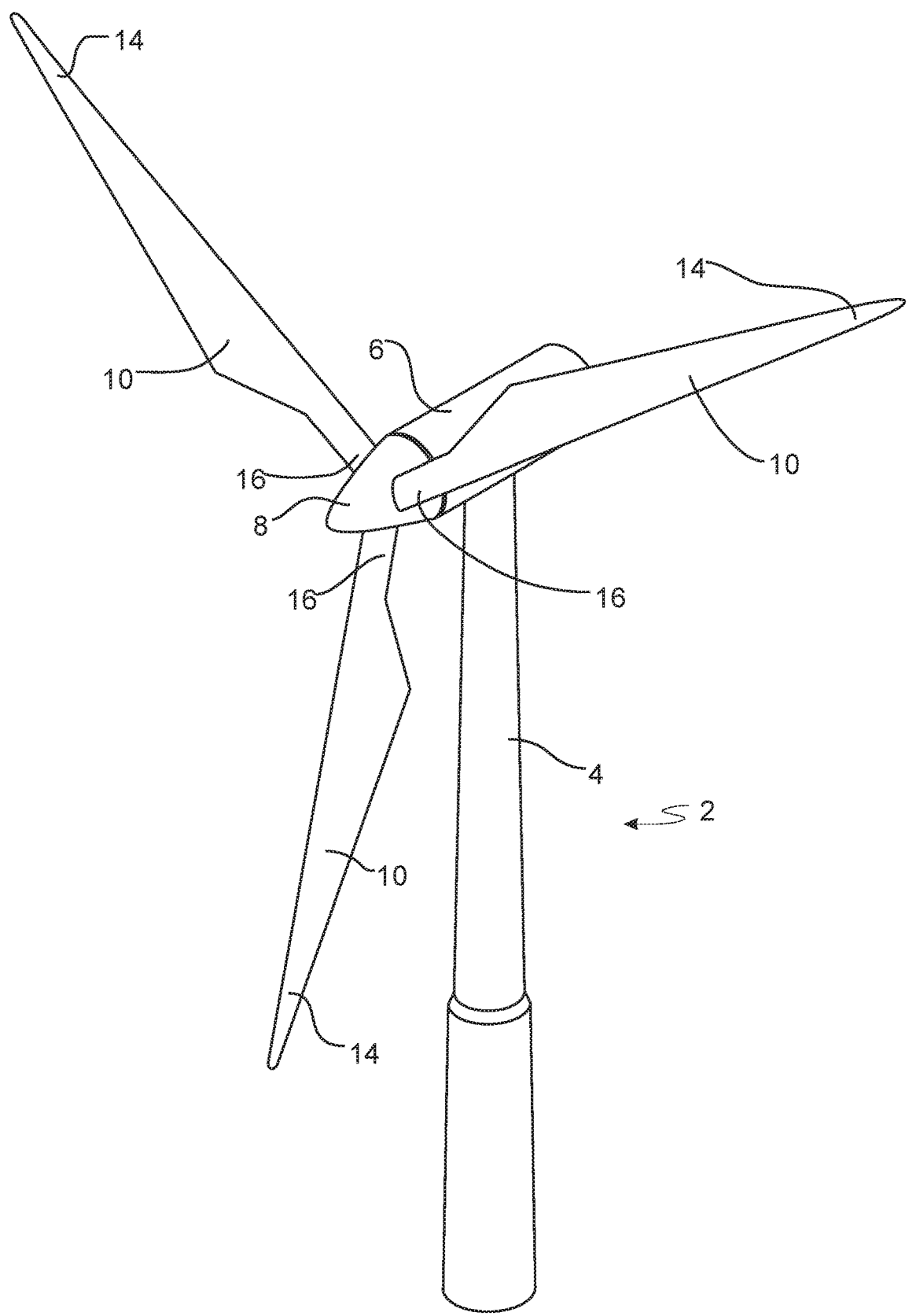
FIG. 1 illustrates a conventional modern upwind wind turbine.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

Figure 2:
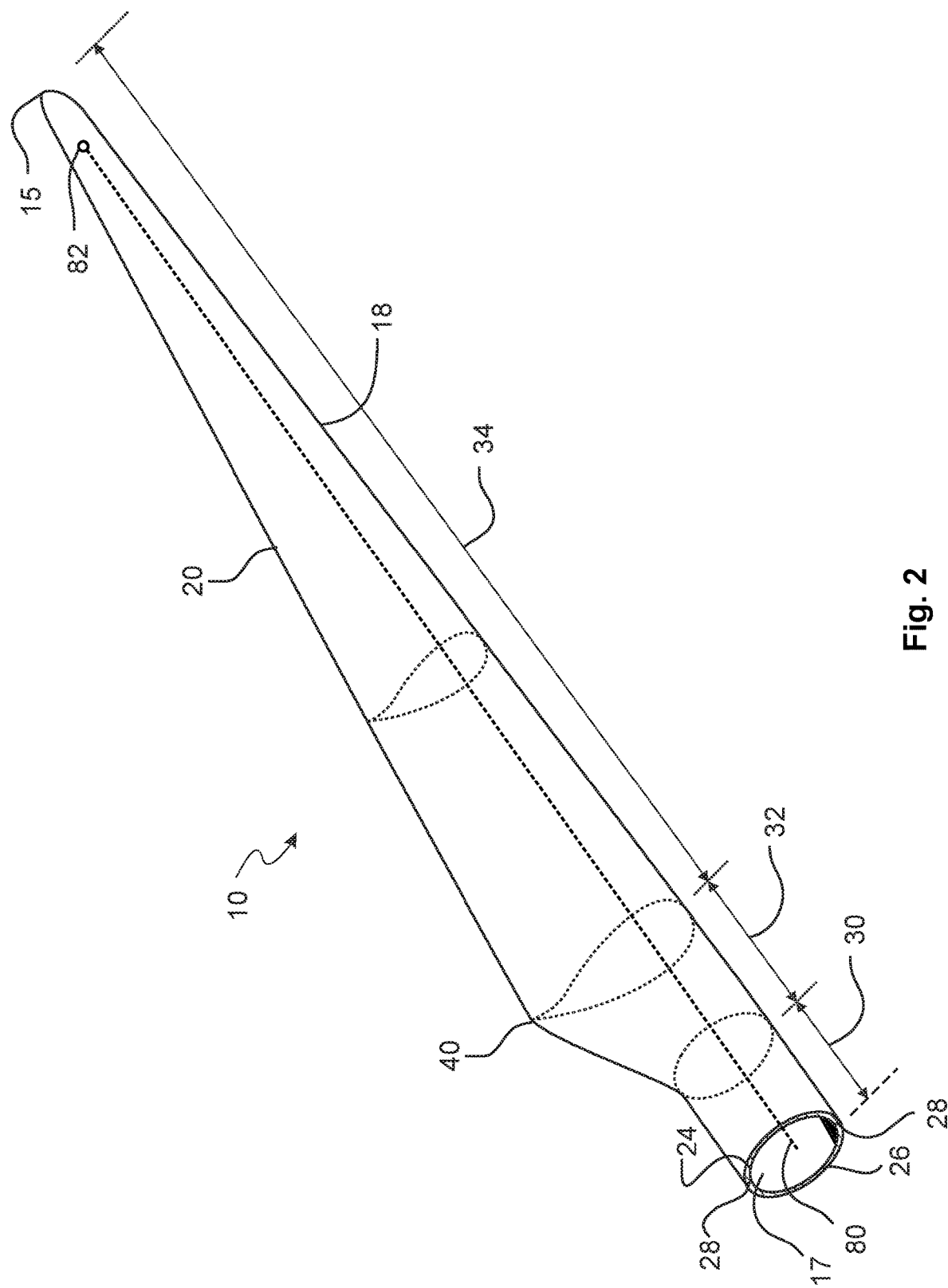
FIG. 2 shows a schematic view of an exemplary wind turbine blade.

FIG. 2 shows a schematic view of an exemplary wind turbine blade 10. The wind turbine blade 10 has the shape of a conventional wind turbine blade with a root end 17 and a tip end 15 and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell comprising two blade shell parts or half shells, a first blade shell part 24 and a second blade shell part 26, typically made of fibre-reinforced polymer. The wind turbine blade 10 may comprise additional shell parts, such as a third shell part and/or a fourth shell part. The first blade shell part 24 is typically a pressure side or upwind blade shell part. The second blade shell part 26 is typically a suction side or downwind blade shell part. The first blade shell part 24 and the second blade shell part 26 are fastened together with adhesive, such as glue, along bond lines or glue joints 28 extending along the trailing edge 20 and the leading edge 18 of the blade 10. Typically, the root ends of the blade shell parts 24, 26 has a semi-circular or semi-oval outer cross-sectional shape.

The wind turbine blade comprises a down conductor 80 and a lightning receptor 82. The down conductor 80 extends in the longitudinal direction and is configured to provide an electrical coupling to the ground.

Figure 3:
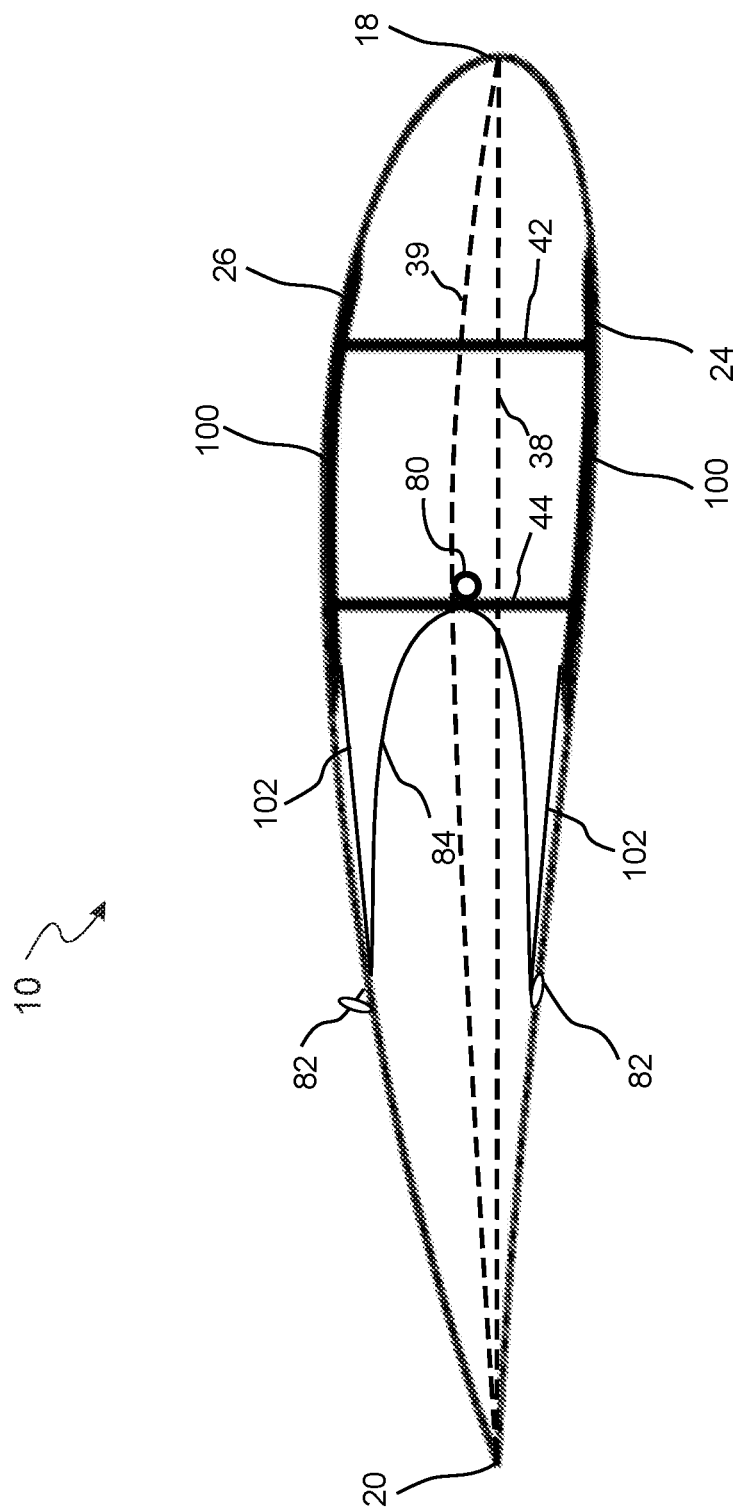
FIG. 3 is a schematic diagram showing a cross sectional view of an exemplary wind turbine blade, FIG. 4 schematically illustrates a main laminate, FIGS. 5a and 5b schematically illustrates a conductive mesh element and a conductive sheet.

FIG. 3 is a schematic diagram illustrating a cross sectional view of an exemplary wind turbine blade 10, e.g. a cross sectional view of the airfoil region of the wind turbine blade 10. The wind turbine blade 10 comprises a leading edge 18, a trailing edge 20, a pressure side 24, and a suction side 26. The wind turbine blade 10 further comprises two main laminates 100, one being arranged towards the pressure side 24 and the other being arranged towards the suction side 26. The wind turbine blade 10 comprises a chord line 38 between the leading edge 18 and the trailing edge 20. Also, a blade median 39 (also sometimes referred to as the camber line) between the pressure side 24 and the suction side 26 is illustrated. The blade median 39 is the median between the pressure side 24 and the suction side 26, measured perpendicular to the chord line 38. The blade median may be found by drawing inscribed circles from the leading edge 18 to the trailing edge 20. The blade median follows the centres of these inscribed circles.

The wind turbine blade 10 comprises shear webs, such as a leading edge shear web 42 and a trailing edge shear web 44. The shear webs 42, 44 extends between the pressure side 24 and the suction side 26 of the wind turbine blade 10, e.g. between the main laminates 100. The main laminates 100 may comprise carbon fibres. The shell parts 24, 26 may comprise glass fibres. The main laminates 100 may comprise pultruded elements, such as pultruded carbon fibre elements.

The down conductor 80 is arranged on the trailing edge shear web 44, more specifically on the leading edge side of the trailing edge shear web 44. In another example, the down conductor 80 may be arranged on the trailing edge side of the trailing edge shear web 44. In another exemplary wind turbine blade, the down conductor may be arranged on a centre web (not shown). The down conductor 80 is extending along the shear web 44. Lightning receptors 82 are arranged at or in proximity of an external surface of the wind turbine blade, e.g. one at the suction side 26 and one at the pressure side. The lightning receptors 82 are electrically connected to the down conductor 80, e.g. via the common connector element 84, as illustrated.

The wind turbine blade 10 also comprises conductive mesh elements 102 for electrically connecting the main laminate to the down conductor 80 and thereby to the ground. The conductive mesh elements 102 may be electrically connected to the down conductor 80 by the common connector element 84, as illustrated. For example, a conductive mesh element 102 may be coupled to a lightning receptor 82, and the conductive mesh element 102 and lightning receptor 82 may be commonly connected to the down conductor 80 by the common connector element 84.

Figure 4:
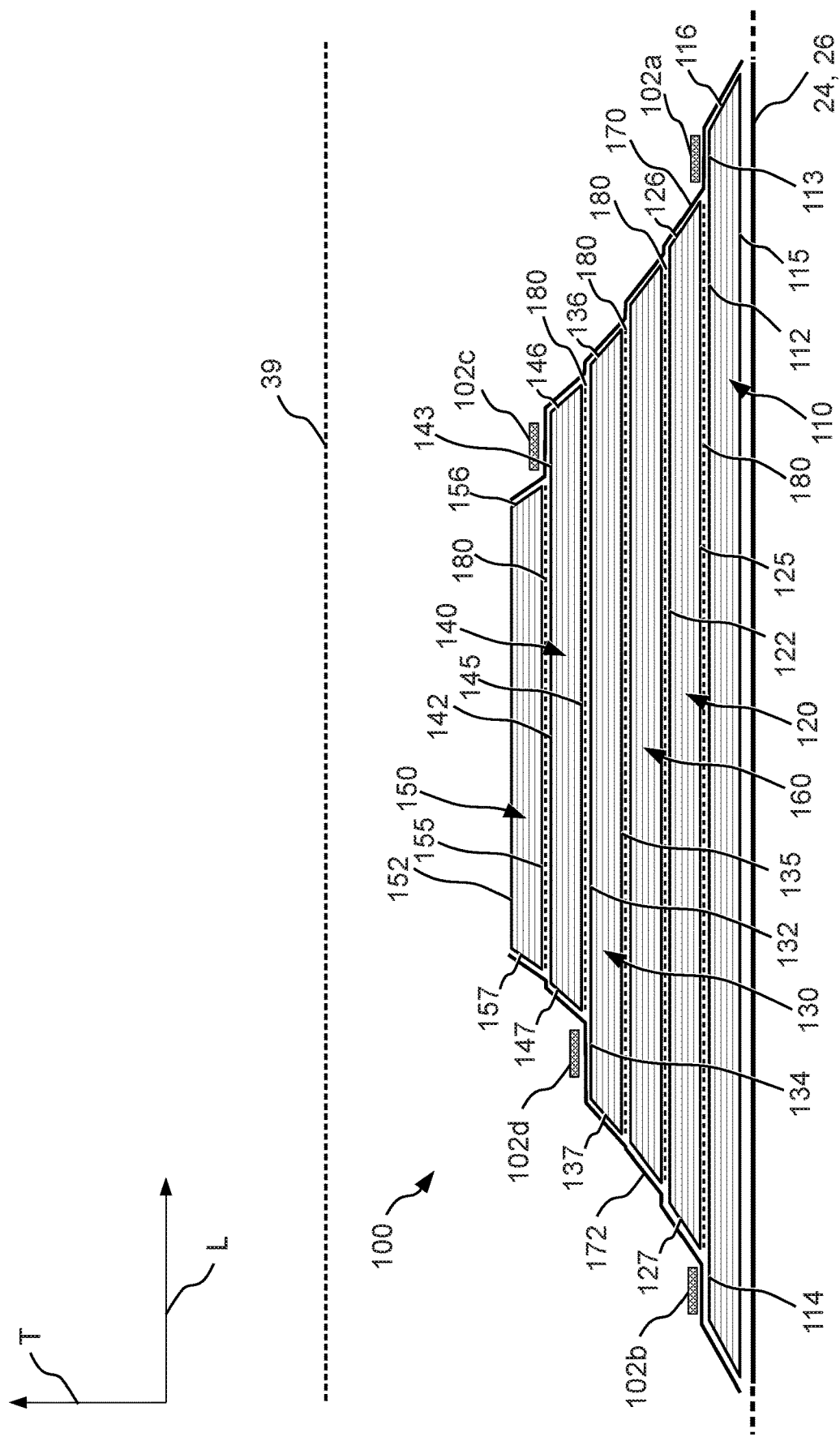

FIG. 4 schematically illustrates a main laminate 100 of a wind turbine blade, such as the wind turbine blade 10 as illustrated in the previous figures. FIG. 4, illustrates a longitudinal view of the main laminate 100. The longitudinal direction L of the wind turbine blade is indicated meaning that the tip of the wind turbine blade comprising the main laminate 100 will be to the right of the drawing, while the root of the wind turbine blade will be to the left of the drawing. Also, a thickness direction T of the main laminate 100 is illustrated, which will be from the shell of the blade 24 26 towards the middle of the blade 39, i.e. the blade median 39 as described in previous figures. The main laminate 100 as illustrated may be the main laminate of either or both of the suction side 24 and the pressure side 26.

The main laminate 100 comprises a plurality of pultruded elements 110, 120, 130, 140, 150. The pultruded elements include a first pultruded element 110 and a second pultruded element 120. The pultruded element may also, as illustrated, comprise a third pultruded element 130, a fourth pultruded element 140, a fifth pultruded element 150. The main laminate 100 may further comprise one or more further, e.g. intermediate, pultruded element(s) 160. Each of the plurality of pultruded elements comprises carbon fibres arranged substantially along the longitudinal direction L. Thereby electrical conductivity in the thickness direction T, may be very poor due to the poor electrical conductivity of the resin suspending the carbon fibres. However, electrical conductivity in the longitudinal direction L may be better due to the electrically conductive carbon fibres extending in this direction.

Each of the plurality of pultruded elements 110, 120, 130, 140, 150 has a top surface 112, 122, 132, 142, 152 and a bottom surface 115, 125, 135, 145, 155 opposite the top surface. The plurality of pultruded elements 110, 120, 130, 140, 150 also have primary end surfaces 116, 126, 136, 146, 156 and secondary end surfaces 117, 127, 137, 147, 157.

The pultruded elements 110, 120, 130, 140, 150 are arranged such that the top surfaces 112, 122, 132, 142, 1522 are facing towards the blade median 39 and the bottom surfaces 115, 125, 135, 145, 155 are facing towards the shell 24, 26. The pultruded elements 110, 120, 130, 140, 150 are further arranged such that the primary end surfaces 116, 126, 136, 146, 156 are facing towards the tip and the secondary end surfaces 117, 127, 137, 147, 157 are facing towards the root.

The second pultruded element 120 is arranged in the thickness direction to be closer to the blade median 39 than the first pultruded element 110. Hence, the first pultruded element 110 is arranged closer to the external surface of the wind turbine blade. The third pultruded element 130 is arranged in the thickness direction to be closer to the blade median 39 than the first pultruded element 110 and the second pultruded element 120. The fourth pultruded element 140 is arranged in the thickness direction to be closer to the blade median 39 than the first pultruded element 110, the second pultruded element 120 and the third pultruded element 130. The fifth pultruded element 150 is arranged in the thickness direction to be closer to the blade median 39 than the first pultruded element 110, the second pultruded element 120, the third pultruded element 130 and the fourth pultruded element 140.

As illustrated, the pultruded elements 110, 120, 130, 140, 150 decrease in length in the thickness direction from the outside, i.e. from the shell 24, 26, towards the blade median 39.

The top surface 112 of the first pultruded element 110 has a first top length along the longitudinal direction L. The top surface 122 of the second pultruded element 120 has a second top length along the longitudinal direction L. The top surface 132 of the third pultruded element 130 has a third top length along the longitudinal direction L. The top surface 142 of the fourth pultruded element 140 has a fourth top length along the longitudinal direction L. The top surface 152 of the fifth pultruded element 150 has a fifth top length along the longitudinal direction L. The top length of a pultruded element is longer than the bottom length of the pultruded element on top of it. The first top length is longer than the second bottom length. The third top length is longer than the fourth bottom length. The fourth top length is longer than the fifth bottom length.

The first pultruded element 110 and the second pultruded element 120 are arranged such that a primary portion 113 of the top surface 112 of the first pultruded element 110 is not covered by the second pultruded element 120. Furthermore, in the illustrated example, the first pultruded element 110 and the second pultruded element 120 are arranged such that a secondary portion 114 of the top surface 112 of the first pultruded element 110 is not covered by the second pultruded element 120.

The third pultruded element 130 and the fourth pultruded element 140 are arranged such that a secondary portion 134 of the top surface 132 of the third pultruded element 130 is not covered by the fourth pultruded element 140.

The fourth pultruded element 140 and the fifth pultruded element 150 are arranged such that a primary portion 143 of the top surface 142 of the fourth pultruded element 140 is not covered by the fifth pultruded element 150.

The main laminate 100 comprises a primary conductive sheet 170 covering the primary end surface 126 of the second pultruded element 120, the primary portion 113 of the top surface 112 of the first pultruded element 110, and the primary end surface 116 of the first pultruded element 110. The primary conductive sheet 170, as illustrated, may also cover the primary end surface 156 of the fifth pultruded element 150, the primary portion 143 of the top surface 142 of the fourth pultruded element 140, the primary end surface 146 of the fourth pultruded element 140, the primary end surface 136 of the third pultruded element 130. The primary conductive sheet 170 may also cover the primary end surface of any intermediate pultruded elements 160. The primary conductive sheet 170 may be or comprise a carbon fibre fabric, such as carbon fibre biaxial fabric or unidirectional carbon fibre fabric. Alternatively or additionally, the primary conductive sheet 170 may be or comprise copper. Alternatively or additionally, the primary conductive sheet 170 may be or comprise a hybrid fabric, e.g. comprising glass fibre and carbon fibre. The hybrid fabric may be a biaxial hybrid fabric or unidirectional hybrid fabric. The primary conductive sheet 170 may comprise one or more layers of conductive material. For example, the primary conductive sheet 170 may comprise a plurality of fabrics, e.g. carbon fabrics, such as carbon biaxial fabrics and/or unidirectional carbon fibre fabrics, and/or hybrid fabrics, such as hybrid biaxial fabrics and/or unidirectional hybrid fibre fabrics, or a combination thereof.

The main laminate 100 comprises a secondary conductive sheet 172 covering the secondary end surface 127 of the second pultruded element 120, the secondary portion 114 of the top surface 112 of the first pultruded element 110, and the secondary end surface 117 of the first pultruded element 110. The secondary conductive sheet 172, as illustrated, may also cover the secondary end surface 157 of the fifth pultruded element 150, the secondary end surface 147 of the fourth pultruded element 140, the secondary portion 134 of the top surface 132 of the third pultruded element 130, the secondary end surface 137 of the third pultruded element 130. The secondary conductive sheet 172 may also cover the secondary end surface of any intermediate pultruded elements 160. The secondary conductive sheet 172 may be or comprise a carbon fibre fabric, such as carbon fibre biaxial fabric or unidirectional carbon fibre fabric. Alternatively or additionally, the secondary conductive sheet 172 may be or comprise copper. Alternatively or additionally, the secondary conductive sheet 172 may be or comprise a hybrid fabric, e.g. comprising glass fibre and carbon fibre. The hybrid fabric may be a biaxial hybrid fabric or unidirectional hybrid fabric. The secondary conductive sheet 172 may comprise one or more layers of conductive material. For example, the secondary conductive sheet 172 may comprise a plurality of fabrics, e.g. carbon fabrics, such as carbon biaxial fabrics and/or unidirectional carbon fibre fabrics, and/or hybrid fabrics, such as hybrid biaxial fabrics and/or unidirectional hybrid fibre fabrics, or a combination thereof.

The main laminate 100 comprises a first primary conductive mesh element 102a arranged at the primary portion 113 of the top surface 112 of the first pultruded element 110, e.g. with the primary conductive sheet 170 in between. The first primary conductive mesh element 102a is configured for being electrically connected to a down conductor of the wind turbine blade, e.g. such as to create an electrical coupling between the fibres of the pultruded elements 110, 120, 130, 140, 150 and the down conductor of the wind turbine blade, e.g. via the primary conductive sheet 170 and the primary end surfaces 116, 126, 136, 146, 156.

Furthermore, as also illustrated, the main laminate 100 may comprise a first secondary conductive mesh element 102*b* arranged at the secondary portion 114 of the top surface 112 of the first pultruded element 110, e.g. with the secondary conductive sheet 172 in between. The first secondary conductive mesh element 102*b* is configured for being electrically connected to the down conductor of the wind turbine blade, e.g. such as to create an electrical coupling between the fibres of the pultruded elements 110, 120, 130, 140, 150 and the down conductor of the wind turbine blade, e.g. via the secondary conductive sheet 172 and the secondary end surfaces 117, 127, 137, 147, 157.

Furthermore, as also illustrated, the main laminate 100 may comprise a fourth secondary conductive mesh element 102*c* arranged at the primary portion 143 of the top surface 142 of the fourth pultruded element 140, e.g. with the primary conductive sheet 170 in between, and/or a third secondary conductive mesh element 102*d* arranged at the secondary portion 134 of the top surface 132 of the third pultruded element 130, e.g. with the secondary conductive sheet 172 in between.

The primary portions 113, 143 and secondary portions 114, 134 of the top surfaces 112, 132, 142 may have a length along the longitudinal direction L adapted to accommodate the conductive mesh elements 102*a*, 102*b*, 102*c*, 102*d*, such as at least 200 mm, such as at least 300 mm, such as at least 400 mm, such as at least 500 mm.

The main laminate 100 comprises sheets of fibre material 180 between the pultruded elements 110, 120,130, 140, 150, 160, e.g. between top surfaces and bottom surfaces. The sheets of fibre material 180 may be glass fibre, carbon fibre or a combination thereof, and may be provided to enhance flow of resin between the pultruded elements, during manufacture, e.g. during vacuum assisted resin transfer.

Figure 5:
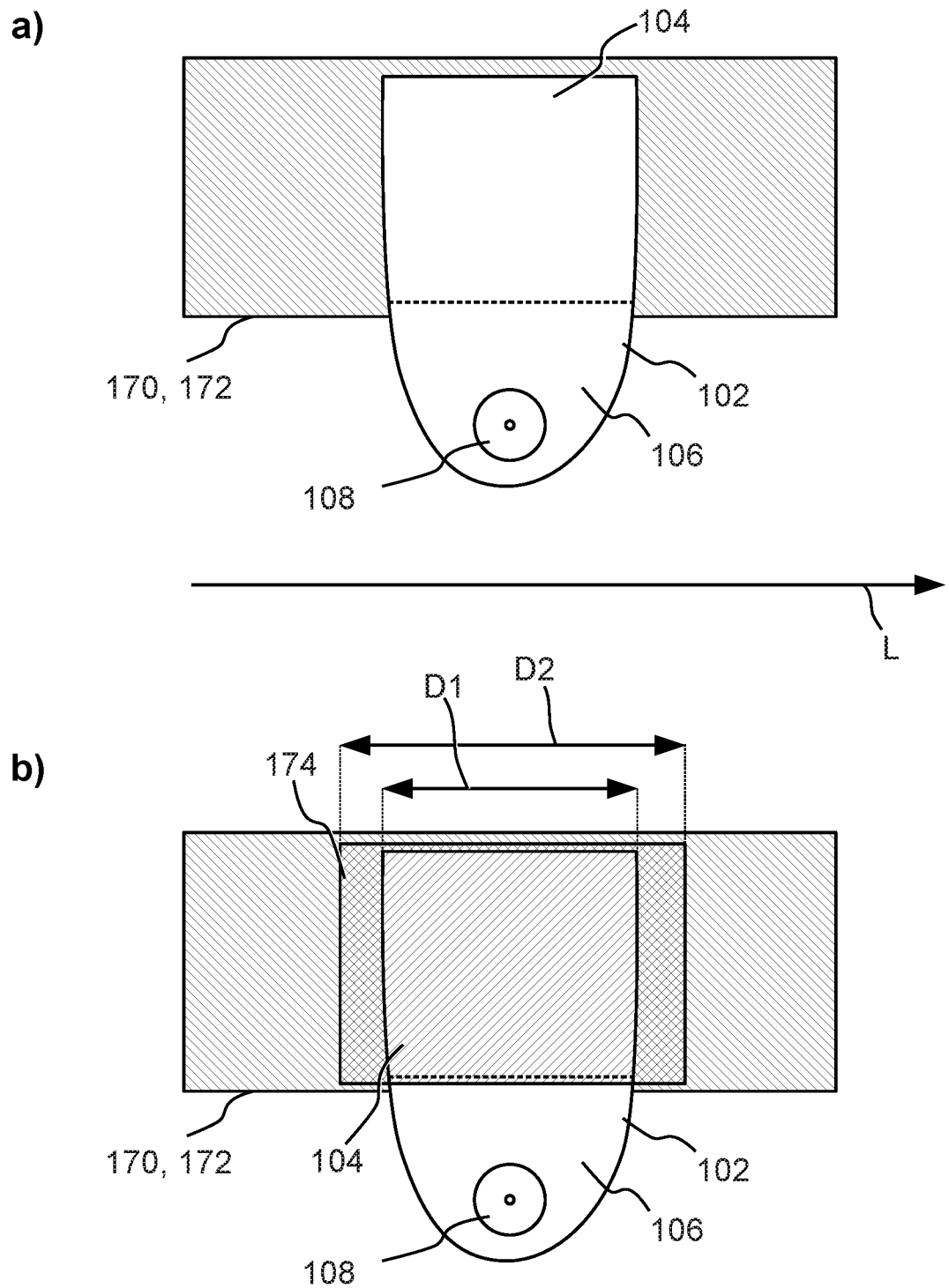

FIGS. 5*a* and 5*b* schematically illustrates a conductive mesh element 102 and a conductive sheet 170, 172, which, as described above, may comprise one or more layers of conductive material. The conductive mesh element 102 may be any of the conductive mesh elements 102*a*, 102*b*, 102*c*, 102*d*, as described with respect to FIG. 4, and the conductive sheet 170, 172 may be the primary conductive sheet 170 and/or the secondary conductive sheet 172 as also described with respect to FIG. 4.

FIG. 5*a* illustrates the conductive mesh element 102 being arranged on top of the conductive sheet 170, 172. The conductive mesh element 102 has a first mesh portion 104 and a second mesh portion 106. The first mesh portion 104 is arranged at the primary portion of the top surface of a pultruded element, as illustrated in FIG. 4, e.g. such that the first mesh portion 104 is in contact with the conductive sheet 170, 172. The second mesh portion 106 includes a connector disc 108. In electrically connecting the conductive mesh element 102 to the down conductor, the connector disc 108 may be the point of connection between the conductive mesh element 102 and other components of the lightning protection system, such as lightning receptors, common connector elements etc.

FIG. 5*b* illustrates that a conductive patch 174 is arranged on top of the first mesh portion 104 of the conductive mesh element 102 and the conductive sheet 170, 172. Thereby, the first mesh portion 104 of the conductive mesh element 102 is arranged between the conductive patch 174 and the conductive sheet 170, 172. The conductive patch 174 is in contact with the conductive sheet 170, 172, and the conductive patch 174 has a length D2 in the longitudinal direction L which is longer than a length D1 of the first mesh portion 104 of the conductive mesh element 102 in the longitudinal direction L. Thereby, the conductive patch 174 may provide a more uniform electrical coupling between the conductive sheet 170, 172 and the conductive mesh element 102. The conductive patch 174 and the conductive sheet 170, 172 may be substantially the same material, e.g. carbon fibre fabric, such as biaxial carbon fabric or unidirectional carbon fabric, or hybrid fabric, e.g. comprising glass fibres and carbon fibre. The conductive patch 174 may be in contact with the conductive sheet 170, 172 at a longitudinal position towards the tip relative to the first portion of the conductive mesh element 102 and/or at a longitudinal position towards the root relative to the first portion of the conductive mesh element 102. In the illustrated example, the conductive patch 174 is in contact with the conductive sheet 170, 172 on both sides of the conductive mesh element 102, i.e. at longitudinal positions towards the root and towards the tip relative to the conductive mesh element 102.

Figure 6:
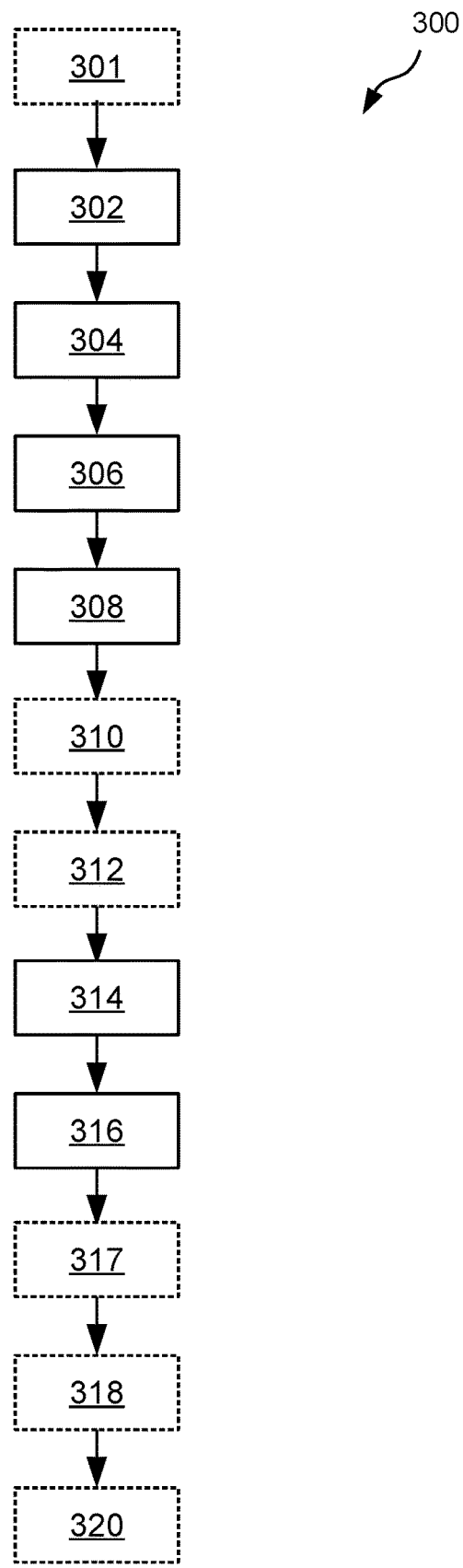
FIG. 6 is a block diagram of an exemplary method, and FIG. 7a-f schematically illustrates exemplary steps of the method.

FIG. 6 is a block diagram of an exemplary method 300, such as a method for manufacturing a main laminate for a wind turbine blade. Such as a wind turbine blade as disclosed with respect to the previous figures.

The method 300 optionally comprise providing 301 a main laminate mould having a main cavity and one or more primary and/or secondary cavities, e.g. including a first primary cavity, being interconnected with the main cavity. The main cavity has a main depth and the one or more primary and/or secondary cavities has a second depth. The main depth being larger than the second depth.

The method 300 comprises providing 302 a plurality of pultruded elements including a first pultruded element and a second pultruded element. The plurality of pultruded elements may further include a third pultruded element, a fourth pultruded element and/or a fifth pultruded element. The plurality of pultruded elements may comprise one or more intermediate pultruded elements. Each of the plurality of pultruded elements comprises carbon fibres arranged substantially along a longitudinal direction. Each of the plurality of pultruded elements has a top surface and a bottom surface opposite the top surface. Each of the plurality of pultruded elements has a primary end surface and a secondary end surface.

The method 300 comprises arranging 304 the plurality of pultruded elements, e.g. in the main cavity of the main laminate mould. The plurality of pultruded elements are arranged 304 such that the second pultruded element is arranged in the thickness direction to be closer to the blade median than the first pultruded element, and such that a primary portion and optionally a secondary portion of the top surface of the first pultruded element is not covered by the second pultruded element. Arranging 304 the plurality of pultruded elements may comprise arranging the third pultruded element to be closer to the blade median than the second pultruded element, the fourth pultruded element to be closer to the blade median than the third pultruded element and/or the fifth pultruded element to be closer to the blade median than the fourth pultruded element. The third, fourth and/or fifth pultruded element may be arranged such that primary and/or secondary portions of the top surfaces are not covered by another pultruded element.

The method 300 comprises providing 306 a primary conductive sheet and arranging 308 the primary conductive sheet to cover the primary end surface of the second pultruded element, the primary portion of the top surface of the first pultruded element, and the primary end surface of the first pultruded element. The primary conductive sheet may further be arranged 308 to cover primary end surfaces and/or primary portions of top surfaces of other pultruded elements, such as of the third, fourth and/or fifth pultruded elements. The primary conductive sheet may comprise one or more layers of conductive material.

The method 300 optionally comprise providing 310 a secondary conductive sheet and arranging 312 the secondary conductive sheet to cover the secondary end surface of the second pultruded element, the secondary portion of the top surface of the first pultruded element, and the secondary end surface of the first pultruded element. The secondary conductive sheet may further be arranged 312 to cover secondary end surfaces and/or secondary portions of top surfaces of other pultruded elements, such as of the third, fourth and/or fifth pultruded elements. The secondary conductive sheet may comprise one or more layers of conductive material.

The method 300 comprises providing 314 one or more conductive mesh elements, such as a first primary conductive mesh element, a first secondary conductive mesh element, and/or further conductive mesh elements. Each of the one or more conductive mesh elements comprises a first mesh portion, and each of the one or more conductive mesh elements is configured to be electrically connected to a down conductor of the wind turbine blade for providing an electrical coupling to the ground. The method 300 comprises arranging 316 each of the one or more conductive mesh element, such that the first mesh portion is at a primary or secondary portion of a top surface of a pultruded element. For example, the first primary conductive mesh element may be arranged 316 such that the first mesh portion of the first primary conductive mesh element is at the primary portion of the top surface of the first pultruded element. Each of the one or more conductive mesh elements may comprise a second mesh portion. The conductive mesh elements may be arranged 316 such that the second mesh portion is in the primary and/or secondary cavity of the main laminate mould.

The method 300 may comprise arranging 317 conductive patch(es) on top of each of the one or more conductive mesh elements, e.g. on top of the first mesh portion of each of the one or more conductive mesh elements. For example, the conductive patch(es) may be arranged such that the first mesh portions of each of the one or more conductive mesh elements are arranged between a conductive patch and a conductive sheet, such as the primary and/or secondary conductive sheet as described above. The conductive patch may be arranged 317 to be in contact with the conductive sheet at a longitudinal position towards the tip relative to the first portion of the conductive mesh element and/or at a longitudinal position towards the root relative to the first portion of the conductive mesh element.

The method 300 may comprise infusing 318 the main laminate, such as the provided components of the main laminate, with a resin, such as vinyl ester or epoxy. The resin may be infused by a vacuum assisted resin transfer method. The method 300 may further comprise curing 320 the resin.

FIG. 7*a-f* schematically illustrates exemplary steps of the method 300 as described in relation to FIG. 6. FIGS. 7*a-f* shows longitudinal views as well as a cross sectional view as indicated on the longitudinal view.

Figure 7:
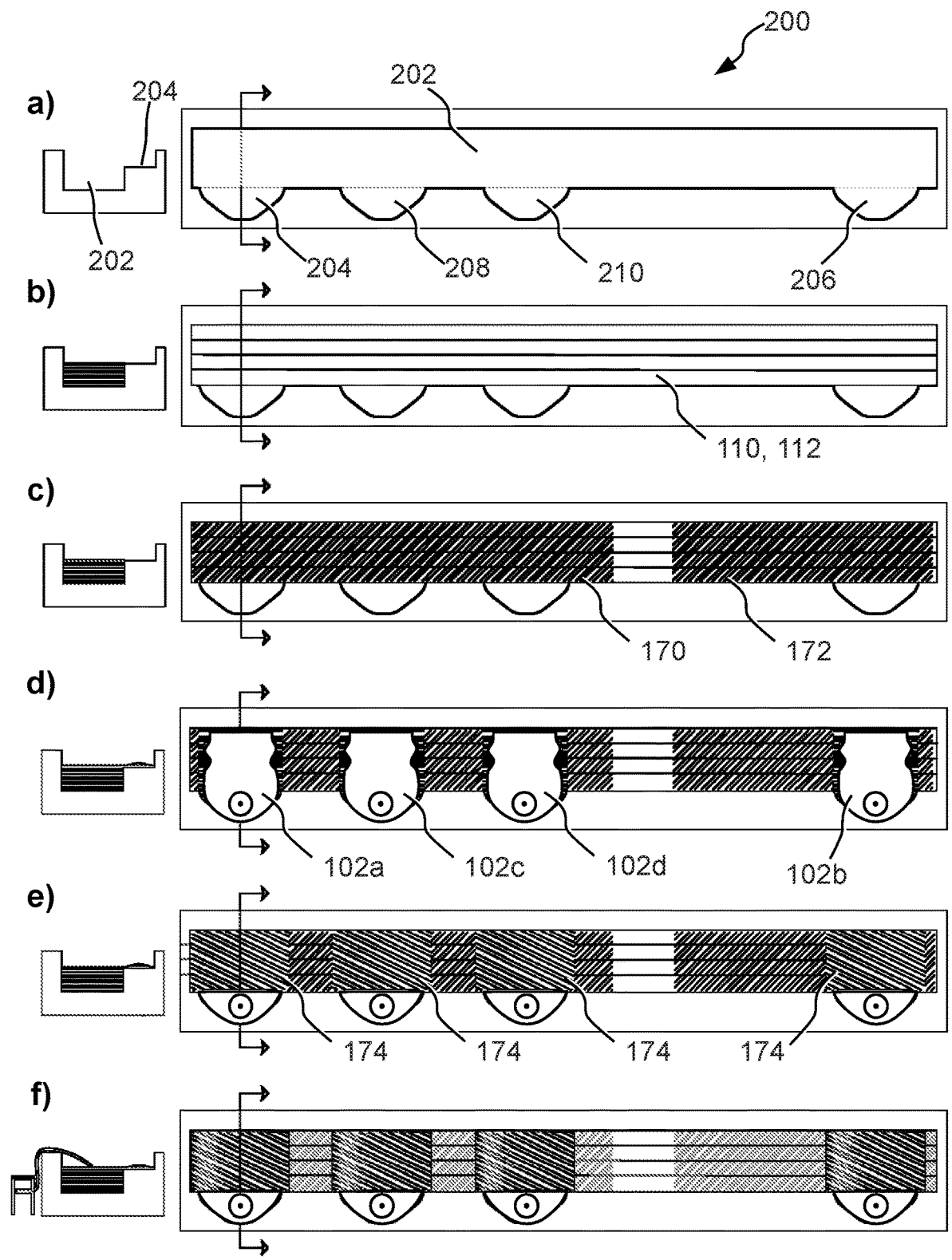

In FIG. 7*a*, a main laminate mould 200 is provided. The main laminate mould 200 has a main cavity 202 and one or more primary and/or secondary cavities, e.g. including a first primary cavity 204, a first secondary cavity 206, a second primary cavity 208 and a third primary cavity 210. The one or more primary and/or secondary cavities 204, 206, 208, 210, are interconnected with the main cavity 202. The main cavity 202 has a main depth and the one or more primary and/or secondary cavities has a second depth, the second depth for each of the one or more primary and/or secondary cavity may be the same or they may be different. As illustrated in the cross sectional view, the main depth, i.e. the depth of the main cavity 202, is larger than the second depth, i.e. the depths of the one or more primary and/or secondary cavities 204, 206, 208, 210.

In FIG. 7*b* a plurality of pultruded elements, including a first pultruded element 110, is provided an arranged in the main cavity 202 of the main laminate mould 200.

In FIG. 7*c* a primary conductive sheet 170, such as the primary conductive sheet 170 as described with respect to FIG. 4, is provided and arranged to cover part of the pultruded elements towards a primary end, e.g. covering the primary end surfaces of the pultruded elements, as well as portions of the top surfaces of the pultruded elements, e.g. a primary portion of the top surface 110 of the first pultruded element 110.

In FIG. 7*c* a secondary conductive sheet 172, such as the secondary conductive sheet 172 as described with respect to FIG. 4, is provided and arranged to cover part of the pultruded elements towards a secondary end (opposite the primary end), e.g. covering the secondary end surfaces of the pultruded elements, as well as portions of the top surfaces of the pultruded elements, e.g. a secondary portion of the top surface 110 of the first pultruded element 110.

In FIG. 7*d* one or more conductive mesh elements, such as a first primary conductive mesh element 102*a*, a first secondary conductive mesh element 102*b*, a second primary conductive mesh element 102*c*, a third primary conductive mesh element 102*d*, are arranged such that a first mesh portion of each of the conductive mesh elements 102*a-d*, is at a primary or secondary portion of a top surface of a pultruded element, and a second mesh portion of the conductive mesh elements 102*a-d*, is in a primary and/or secondary cavity 204, 206, 208, 210 of the main laminate mould 200. For example, the first mesh portion of the first primary conductive mesh element 102*a* is arranged at the primary portion of the top surface 112 of the first pultruded element 110, and the second mesh portion of the first primary conductive mesh element 102*a* is arranged in the first primary cavity 204 of the main laminate mould 200.

In FIG. 7*e*, conductive patch(es) 174 are arranged on top of the first mesh portion of each of the one or more conductive mesh elements 102*a-d*. The conductive patches 174 are further arranged to be in contact with the conductive sheets 170, 172 at longitudinal positions towards the primary end (e.g. towards the tip) and towards the secondary end (e.g. towards the root) relative to the first portion of the respective conductive mesh element 102*a-d*.

In FIG. 7*f*, the provided components in the main laminate mould 200 are infused with resin, e.g. by a vacuum assisted resin transfer method.

The invention has been described with reference to a preferred embodiment. However, the scope of the invention is not limited to the illustrated embodiment, and alterations and modifications can be carried out without deviating from the scope of the invention.

Throughout the description, the use of the terms "first", "second", "third", "fourth", "primary", "secondary", "tertiary" etc. does not imply any particular order or importance, but are included to identify individual elements. Furthermore, the labelling of a first element does not imply the presence of a second element and vice versa.

LIST OF REFERENCES 2 wind turbine
4 tower
6 nacelle
8 hub
10 blade
14 blade tip
15 tip end
16 blade root
17 root end
18 leading edge
20 trailing edge
24 first blade shell part (pressure side)
26 second blade shell part (suction side)
28 bond lines/glue joints
30 root region
32 transition region
34 airfoil region
38 chord line
39 blade median
40 shoulder
42 leading edge shear web
44 trailing edge shear web
80 down conductor
82 lightning receptor
84 common connector element
100 main laminate
102 conductive mesh element
104 first mesh portion
106 second mesh portion
108 connector disc
110 first pultruded element
112 top surface
113 primary portion of top surface
114 secondary portion of top surface
115 bottom surface
116 primary end surface
117 secondary end surface
120 second pultruded element
122 top surface
125 bottom surface
126 primary end surface
127 secondary end surface
130 third pultruded element
132 top surface
134 secondary portion of top surface
135 bottom surface
136 primary end surface
137 secondary end surface
140 fourth pultruded element
142 top surface
143 primary portion of top surface
145 bottom surface
146 primary end surface
147 secondary end surface
150 fifth pultruded element
152 top surface
155 bottom surface
156 primary end surface
157 secondary end surface
160 intermediate pultruded element(s)
170 primary conductive sheet
172 secondary conductive sheet
174 conductive patch
180 sheet of fibre material
200 main laminate mould
202 main cavity
204 first primary cavity
206 first secondary cavity
208 second primary cavity
210 third primary cavity
300 method
301 providing a main laminate mould
302 providing pultruded element(s)
304 arranging pultruded element(s)
306 providing primary conductive sheet
308 arranging primary conductive sheet
310 providing secondary conductive sheet
312 arranging secondary conductive sheet
314 providing conductive mesh element(s)
316 arranging conductive mesh element(s)
317 arranging conductive path(es)
318 infusing resin
320 curing resin

The invention claimed is:

1. A wind turbine blade extending in a longitudinal direction from a root to a tip, the wind turbine blade comprising a pressure side, a suction side, a chord line extending between a leading edge and a trailing edge, and a blade median between the pressure side and the suction side, the wind turbine blade comprising a main laminate extending along the longitudinal direction, the main laminate has a thickness direction substantially perpendicular to the longitudinal direction and substantially perpendicular to the chord line, the main laminate comprising a plurality of pultruded elements including a first pultruded element, a second pultruded element, a third pultruded element and a fourth pultruded element, wherein each of the plurality of pultruded elements comprises carbon fibres arranged substantially along the longitudinal direction, each of the plurality of pultruded elements having a top surface facing towards the blade median and a bottom surface opposite the top surface, and each of the plurality of pultruded elements having a primary end surface towards the tip and a secondary end surface towards the root, the second pultruded element being arranged in the thickness direction to be closer to the blade median than the first pultruded element, the fourth pultruded element being arranged in the thickness direction to be closer to the blade median than the third pultruded element, the top surface of the first pultruded element having a first top length along the longitudinal direction, the bottom surface of the second pultruded element having a second bottom length, the first top length being longer than the second bottom length, and the first pultruded element and the second pultruded element being arranged such that a primary portion of the top surface of the first pultruded element is not covered by the second pultruded element, the main laminate comprising a primary conductive sheet covering the primary end surface of the second pultruded element, the primary portion of the top surface of the first pultruded element, and the primary end surface of the first pultruded element, the main laminate comprising a first primary conductive mesh element comprising a first mesh portion arranged at the primary portion of the top surface of the first pultruded element, the third pultruded element and the fourth pultruded element being arranged such that a secondary portion of the top surface of the third pultruded element is not covered by the fourth pultruded element,
wherein the main laminate further comprises a secondary conductive sheet covering a secondary end surface of the fourth pultruded element, the secondary portion of the top surface of the third pultruded element, and a secondary end surface of the third pultruded element,
the main laminate further comprising a second secondary conductive mesh element comprising a first mesh portion arranged at the secondary portion of the top surface of the third pultruded element, and
wherein the wind turbine blade comprises a down conductor extending in the longitudinal direction and being configured to provide an electrical coupling to the ground, the first primary conductive mesh element and the second secondary conductive mesh element being electrically connected to the down conductor.

2. The wind turbine blade according to claim 1, wherein the primary portion of the top surface of the first pultruded element has a length along the longitudinal direction of at least 200 mm.

3. The wind turbine blade according to claim 1, wherein each of the plurality of pultruded elements comprising an element thickness along the thickness direction of the main laminate between the top surface and the bottom surface, the element thickness being substantially uniform.

4. The wind turbine blade according to claim 1, wherein the primary end surface of each of the plurality of pultruded elements forms a primary top angle with the top surface and a primary bottom angle with the bottom surface, and wherein the primary top angle is more than 90 degrees, and the primary bottom angle is less than 90 degrees.

5. The wind turbine blade according to claim 1, wherein a sheet of fibre material is arranged between the top surface of the first pultruded element and the bottom surface of the second pultruded element.

6. The wind turbine blade according to claim 1, wherein the primary conductive sheet is arranged between the first mesh portion of the first primary conductive mesh element and the primary portion of the top surface of the first pultruded element.

7. The wind turbine blade according to claim 1, wherein the main laminate comprises a first primary conductive patch arranged such that the first mesh portion of the first primary conductive mesh element is arranged between the first primary conductive patch and the primary conductive sheet, and wherein the first primary conductive patch is in contact with the primary conductive sheet, the first primary conductive patch having a length in the longitudinal direction which is longer than a length of the first mesh portion of the first primary conductive mesh element in the longitudinal direction.

8. The wind turbine blade according to claim 1, wherein the first primary conductive mesh element comprises a second mesh portion including a connector disc, and wherein the first primary conductive mesh element is electrically connected to the down conductor via the connector disc of the first primary conductive mesh element.

9. The wind turbine blade according to claim 1, wherein the first pultruded element and the second pultruded element are arranged such that a secondary portion of the top surface of the first pultruded element is not covered by the second pultruded element,
the main laminate comprising a secondary conductive sheet covering the secondary end surface of the second pultruded element, the secondary portion of the top surface of the first pultruded element, and the secondary end surface of the first pultruded element, and
the main laminate comprising a first secondary conductive mesh element comprising a first mesh portion arranged at the secondary portion of the top surface of the first pultruded element, the first secondary conductive mesh element being electrically connected to the down conductor.

10. The wind turbine blade according to claim 9, wherein the secondary portion of the top surface of the first pultruded element has a length along the longitudinal direction of at least 200 mm.

11. The wind turbine blade according to claim 1, wherein the third pultruded element and the fourth pultruded element are arranged such that a primary portion of the top surface of the third pultruded element is not covered by the fourth pultruded element,
the primary conductive sheet covering the primary end surface of the fourth pultruded element, the primary portion of the top surface of the third pultruded element, and the primary end surface of the third pultruded element, and
the main laminate comprising a second primary conductive mesh element comprising a first mesh portion arranged at the primary portion of the top surface of the third pultruded element, the second primary mesh element being electrically connected to the down conductor.

12. The wind turbine blade according to claim 1, wherein the plurality of pultruded elements includes one or more intermediate pultruded elements, and
wherein the one or more intermediate pultruded elements is arranged in the thickness direction to be closer to the blade median than the second pultruded element.

13. The wind turbine blade according to claim 1, comprising a shear web extending between the pressure side and the suction side of the wind turbine blade, e.g. between the main laminate being arranged towards one of the pressure side and the suction side of the wind turbine blade, and another main laminate being arranged towards the other of the pressure side and suction side,
wherein the down conductor is arranged on the shear web and extending along the shear web.

14. The wind turbine blade according to claim 1, comprising one or more lightning receptors, including a first lightning receptor, at or in proximity of an external surface of the wind turbine blade, the one or more lightning receptors being electrically connected to the down conductor.

15. The wind turbine blade according to claim 14, wherein the first lightning receptor and the first primary conductive mesh element is electrically connected to the down conductor by a common connector element.

16. A method for manufacturing a main laminate for a wind turbine blade extending in a longitudinal direction from a root to a tip and comprising a pressure side, a suction side, a chord line extending between a leading edge and a trailing edge, and a blade median between the pressure side and the suction side, the method comprising:
providing a plurality of pultruded elements including a first pultruded element, a second pultruded element, a third pultruded element and a fourth pultruded element, wherein each of the plurality of pultruded elements comprises carbon fibres arranged substantially along a longitudinal direction, each of the plurality of pultruded elements having a top surface and a bottom surface opposite the top surface, and each of the plurality of pultruded elements having a primary end surface and a secondary end surface;

arranging the plurality of pultruded element such that the second pultruded element is arranged in the thickness direction to be closer to the blade median than the first pultruded element, such that the fourth pultruded element is arranged in the thickness direction to be closer to the blade median than the third pultruded element, such that a primary portion of the top surface of the first pultruded element is not covered by the second pultruded element, and such that a secondary portion of the top surface of the third pultruded element is not covered by the fourth pultruded element;

providing a primary conductive sheet;

arranging the primary conductive sheet to cover the primary end surface of the second pultruded element, the primary portion of the top surface of the first pultruded element, and the primary end surface of the first pultruded element;

providing a secondary conductive sheet;

arranging the secondary conductive sheet to cover a secondary end surface of the fourth pultruded element, the secondary portion of the top surface of the third pultruded element, and a secondary end surface of the third pultruded element;

providing a first primary conductive mesh element comprising a first mesh portion, the first primary conductive mesh element being configured to be electrically connected to a down conductor of the wind turbine blade for providing an electrical coupling to the ground;

providing a second secondary conductive mesh element comprising a first mesh portion, the second secondary conductive mesh element being configured to be electrically connected to the down conductor of the wind turbine blade for providing an electrical coupling to the ground;

arranging the first primary conductive mesh element, such that the first mesh portion of the first primary conductive mesh element is at the primary portion of the top surface of the first pultruded element; and arranging the second secondary conductive mesh element, such that the first mesh portion of the second secondary conductive mesh element is at the secondary portion of the top surface of the third pultruded element.

17. The method according to claim 16, comprising arranging a first primary conductive patch such that the first mesh portion of the first primary conductive mesh element is arranged between the first primary conductive patch and the primary conductive sheet, and such that the first primary conductive patch is in contact with the primary conductive sheet.

18. The method according to claim 16, comprising infusing the main laminate with a resin and curing the resin.

19. The method according to claim 16, comprising providing a main laminate mould having a main cavity and a first primary cavity being interconnected, the main cavity having a main depth and the first primary cavity having a second depth, the main depth being larger than the second depth, wherein the plurality of pultruded element are arranged in the main cavity of the main laminate mould, wherein the first primary conductive mesh element comprises a second mesh portion, and wherein the first primary conductive mesh element is arranged such that the second mesh portion is in the first primary cavity.

20. A wind turbine blade extending in a longitudinal direction from a root to a tip, the wind turbine blade comprising a pressure side, a suction side, a chord line extending between a leading edge and a trailing edge, and a blade median between the pressure side and the suction side, the wind turbine blade comprising a main laminate extending along the longitudinal direction, the main laminate has a thickness direction substantially perpendicular to the longitudinal direction and substantially perpendicular to the chord line, the main laminate comprising a plurality of pultruded elements including a first pultruded element, a second pultruded element, wherein each of the plurality of pultruded elements comprises carbon fibres arranged substantially along the longitudinal direction, each of the plurality of pultruded elements having a top surface facing towards the blade median and a bottom surface opposite the top surface, and each of the plurality of pultruded elements having a primary end surface towards the tip and a secondary end surface towards the root, the second pultruded element being arranged in the thickness direction to be closer to the blade median than the first pultruded element, the top surface of the first pultruded element having a first top length along the longitudinal direction, the bottom surface of the second pultruded element having a second bottom length, the first top length being longer than the second bottom length, and the first pultruded element and the second pultruded element being arranged such that a primary portion of the top surface of the first pultruded element is not covered by the second pultruded element, and such that a secondary portion of the top surface of the first pultruded element is not covered by the second pultruded element, the main laminate comprising a primary conductive sheet covering the primary end surface of the second pultruded element, the primary portion of the top surface of the first pultruded element, and the primary end surface of the first pultruded element, the main laminate comprising a first primary conductive mesh element comprising a first mesh portion arranged at the primary portion of the top surface of the first pultruded element, the main laminate comprising a secondary conductive sheet covering the secondary end surface of the second pultruded element, the secondary portion of the top surface of the first pultruded element, and the secondary end surface of the first pultruded element, the main laminate comprising a first secondary conductive mesh element comprising a first mesh portion arranged at the secondary portion of the top surface of the first pultruded element, and wherein the wind turbine blade comprises a down conductor extending in the longitudinal direction and being configured to provide an electrical coupling to the ground, the first primary conductive mesh element and the first secondary conductive mesh element being electrically connected to the down conductor.

21. A method for manufacturing a main laminate for a wind turbine blade extending in a longitudinal direction from a root to a tip and comprising a pressure side, a suction side, a chord line extending between a leading edge and a trailing edge, and a blade median between the pressure side and the suction side, the method comprising:

providing a plurality of pultruded elements including a first pultruded element and a second pultruded element, wherein each of the plurality of pultruded elements comprises carbon fibres arranged substantially along a longitudinal direction, each of the plurality of pultruded elements having a top surface and a bottom surface opposite the top surface, and each of the plurality of pultruded elements having a primary end surface and a secondary end surface;

arranging the plurality of pultruded element such that the second pultruded element is arranged in the thickness direction to be closer to the blade median than the first pultruded element, such that a primary portion of the top surface of the first pultruded element is not covered by the second pultruded element, and such that a secondary portion of the top surface of the first pultruded element is not covered by the second pultruded element;

providing a primary conductive sheet;

arranging the primary conductive sheet to cover the primary end surface of the second pultruded element, the primary portion of the top surface of the first pultruded element, and the primary end surface of the first pultruded element;

providing a secondary conductive sheet;

arranging the secondary conductive sheet to cover the secondary end surface of the second pultruded element, the secondary portion of the top surface of the first pultruded element, and the secondary end surface of the first pultruded element;

providing a first primary conductive mesh element comprising a first mesh portion, the first primary conductive mesh element being configured to be electrically connected to a down conductor of the wind turbine blade for providing an electrical coupling to the ground;

providing a second secondary conductive mesh element comprising a first mesh portion, the second secondary conductive mesh element being configured to be electrically connected to the down conductor of the wind turbine blade for providing an electrical coupling to the ground;

arranging the first primary conductive mesh element, such that the first mesh portion of the first primary conductive mesh element is at the primary portion of the top surface of the first pultruded element; and arranging the second secondary conductive mesh element, such that the first mesh portion of the second secondary conductive mesh element is at the secondary portion of the top surface of the first pultruded element.

22. A wind turbine blade extending in a longitudinal direction from a root to a tip, the wind turbine blade comprising a pressure side, a suction side, a chord line extending between a leading edge and a trailing edge, and a blade median between the pressure side and the suction side, the wind turbine blade comprising a main laminate extending along the longitudinal direction, the main laminate has a thickness direction substantially perpendicular to the longitudinal direction and substantially perpendicular to the chord line, the main laminate comprising a plurality of pultruded elements including a first pultruded element and a second pultruded element, wherein each of the plurality of pultruded elements comprises carbon fibres arranged substantially along the longitudinal direction, each of the plurality of pultruded elements having a top surface facing towards the blade median and a bottom surface opposite the top surface, and each of the plurality of pultruded elements having a primary end surface towards the tip and a secondary end surface towards the root, the second pultruded element being arranged in the thickness direction to be closer to the blade median than the first pultruded element, the top surface of the first pultruded element having a first top length along the longitudinal direction, the bottom surface of the second pultruded element having a second bottom length, the first top length being longer than the second bottom length, and the first pultruded element and the second pultruded element being arranged such that a primary portion of the top surface of the first pultruded element is not covered by the second pultruded element, the main laminate comprising a primary conductive sheet covering the primary end surface of the second pultruded element, the primary portion of the top surface of the first pultruded element, and the primary end surface of the first pultruded element, the main laminate comprising a first primary conductive mesh element comprising a first mesh portion arranged at the primary portion of the top surface of the first pultruded element, wherein the primary conductive sheet is arranged between the first mesh portion of the first primary conductive mesh element and the primary portion of the top surface of the first pultruded element, and wherein the wind turbine blade comprises a down conductor extending in the longitudinal direction and being configured to provide an electrical coupling to the ground, the first primary conductive mesh element being electrically connected to the down conductor.

23. A wind turbine blade extending in a longitudinal direction from a root to a tip, the wind turbine blade comprising a pressure side, a suction side, a chord line extending between a leading edge and a trailing edge, and a blade median between the pressure side and the suction side, the wind turbine blade comprising a main laminate extending along the longitudinal direction, the main laminate has a thickness direction substantially perpendicular to the longitudinal direction and substantially perpendicular to the chord line, the main laminate comprising a plurality of pultruded elements including a first pultruded element and a second pultruded element, wherein each of the plurality of pultruded elements comprises carbon fibres arranged substantially along the longitudinal direction, each of the plurality of pultruded elements having a top surface facing towards the blade median and a bottom surface opposite the top surface, and each of the plurality of pultruded elements having a primary end surface towards the tip and a secondary end surface towards the root, the second pultruded element being arranged in the thickness direction to be closer to the blade median than the first pultruded element, the top surface of the first pultruded element having a first top length along the longitudinal direction, the bottom surface of the second pultruded element having a second bottom length, the first top length being longer than the second bottom length, and the first pultruded element and the second pultruded element being arranged such that a primary portion of the top surface of the first pultruded element is not covered by the second pultruded element, the main laminate comprising a primary conductive sheet covering the primary end surface of the second pultruded element, the primary portion of the top surface of the first pultruded element, and the primary end surface of the first pultruded element, the main laminate comprising a first primary conductive mesh element comprising a first mesh portion arranged at the primary portion of the top surface of the first pultruded element, wherein the wind turbine blade comprises a down conductor extending in the longitudinal direction and being configured to provide an electrical coupling to the ground, the first primary conductive mesh element being electrically connected to the down conductor, and wherein the main laminate comprises a first primary conductive patch arranged such that the first mesh portion of the first primary conductive mesh element is arranged between the first primary conductive patch and the primary conductive sheet, and wherein the first primary conductive patch is in contact with the primary conductive sheet, the first primary conductive patch having a length in the longitudinal direction which is longer than a length of the first mesh portion of the first primary conductive mesh element in the longitudinal direction.

24. A method for manufacturing a main laminate for a wind turbine blade extending in a longitudinal direction from a root to a tip and comprising a pressure side, a suction side, a chord line extending between a leading edge and a trailing edge, and a blade median between the pressure side and the suction side, the method comprising:

providing a plurality of pultruded elements including a first pultruded element and a second pultruded element, wherein each of the plurality of pultruded elements comprises carbon fibres arranged substantially along a longitudinal direction, each of the plurality of pultruded elements having a top surface and a bottom surface opposite the top surface, and each of the plurality of pultruded elements having a primary end surface and a secondary end surface;

arranging the plurality of pultruded element such that the second pultruded element is arranged in the thickness direction to be closer to the blade median than the first pultruded element, and such that a primary portion of the top surface of the first pultruded element is not covered by the second pultruded element;

providing a primary conductive sheet;

arranging the primary conductive sheet to cover the primary end surface of the second pultruded element, the primary portion of the top surface of the first pultruded element, and the primary end surface of the first pultruded element;

providing a first primary conductive mesh element comprising a first mesh portion, the first primary conductive mesh element being configured to be electrically connected to a down conductor of the wind turbine blade for providing an electrical coupling to the ground;

arranging the first primary conductive mesh element, such that the first mesh portion of the first primary conductive mesh element is at the primary portion of the top surface of the first pultruded element; and arranging a first primary conductive patch such that the first mesh portion of the first primary conductive mesh element is arranged between the first primary conductive patch and the primary conductive sheet, and such that the first primary conductive patch is in contact with the primary conductive sheet.

25. A method for manufacturing a main laminate for a wind turbine blade extending in a longitudinal direction from a root to a tip and comprising a pressure side, a suction side, a chord line extending between a leading edge and a trailing edge, and a blade median between the pressure side and the suction side, the method comprising:

providing a plurality of pultruded elements including a first pultruded element and a second pultruded element, wherein each of the plurality of pultruded elements comprises carbon fibres arranged substantially along a longitudinal direction, each of the plurality of pultruded elements having a top surface and a bottom surface opposite the top surface, and each of the plurality of pultruded elements having a primary end surface and a secondary end surface;

arranging the plurality of pultruded element such that the second pultruded element is arranged in the thickness direction to be closer to the blade median than the first pultruded element, and such that a primary portion of the top surface of the first pultruded element is not covered by the second pultruded element;

providing a primary conductive sheet;

arranging the primary conductive sheet to cover the primary end surface of the second pultruded element, the primary portion of the top surface of the first pultruded element, and the primary end surface of the first pultruded element;

providing a first primary conductive mesh element comprising a first mesh portion, the first primary conductive mesh element being configured to be electrically connected to a down conductor of the wind turbine blade for providing an electrical coupling to the ground; and arranging the first primary conductive mesh element, such that the first mesh portion of the first primary conductive mesh element is at the primary portion of the top surface of the first pultruded element, and such that the primary conductive sheet is arranged between the first mesh portion of the first primary conductive mesh element and the primary portion of the top surface of the first pultruded element.

* * * * *